Figure 1:
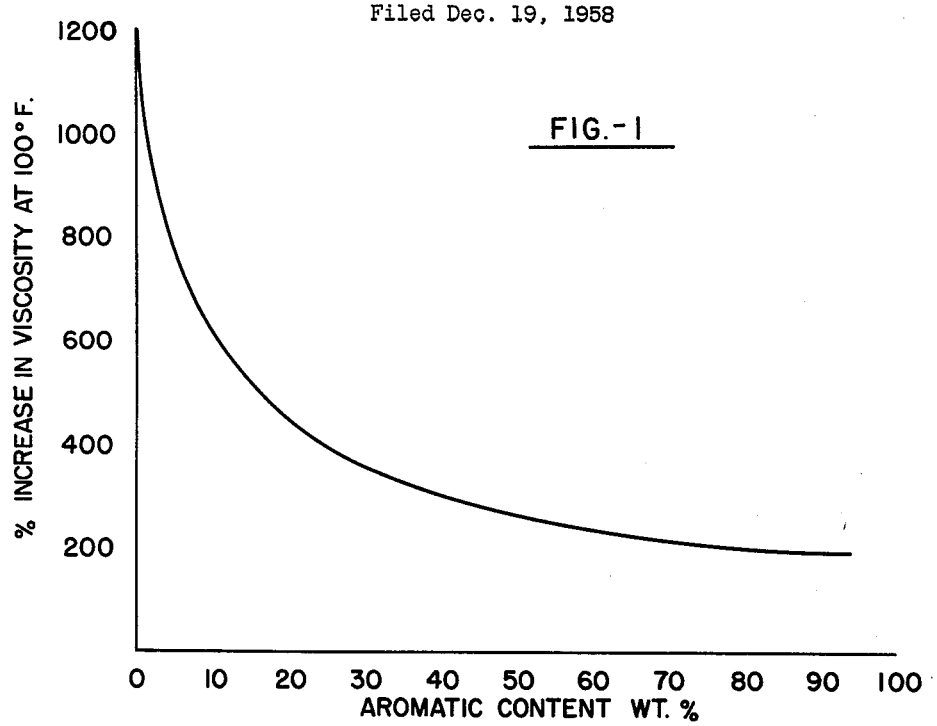

United States Patent Office 3,083,159
Patented Mar. 26, 1963

3,083,159
GREASES
George H. Clark, South Croydon, and Edwin M. Dodds, Henley-on-Thames, England, assignors to Esso Research and Engineering Company, a corporation of Delaware
Filed Dec. 19, 1958, Ser. No. 781,745
Claims priority, application Great Britain Dec. 24, 1957
4 Claims. (Cl. 252—29)

The present invention relates to greases which are suitable for use in lubricating equipment associated with nuclear reactors.

Nuclear reactors for power stations comprise a nuclear reactor zone, a heat transfer medium, and a control mechanism to prevent a temperature run-away due to uninhibited nuclear transformation within the reactor zone. The nuclear reactor zone generates neutron fluxes of a high intensity, for instance about $10^{14}$ neutrons cm.²/sec., by the transformation of uranium fuel into radiation and different forms of matter, the transformation being accompanied by substantial amounts of heat. The heat-transfer medium in many plants now being built consists of carbon dioxide, which transfers heat from the reaction zone to steam-raising plants. In such installations the carbon dioxide reaches high temperatures, e.g. of the order of 400° C., the hot carbon dioxide being circulated by fans. The nuclear transformation process is kept at a desired level by a graphite moderator in which the uranium fuel-rods are contained, the level of activity being capable of variation by the movement of control rods into the moderator. Such control rods may themselves be made of graphite, or a material capable of adsorbing neutrons, such as boron steel. The control rods are operated by a mechanism whereby they can be lowered by gravity into the reactor zone. Such a mechanism may be situated in a zone exposed to less intense radiation than the reactor zone, but nevertheless may be subject to radiation effects of the order of 0.2–100 rads/hour. Besides the general day-to-day movement of the control rod mechanism, the mechanism must be capable of freely-operating in an emergency quickly to drop the control rods entirely within the reactor block, and thus must be adequately lubricated. Further, the fuel cans are manipulated by a charge-discharge apparatus, which may be placed beneath the biological shield, or may be a crane mechanism situated above the biological shield. The charge-discharge apparatus is usually exposed to intermittent doses of radiation of high intensity, and which may total $10^9$ rads/year.

Both the control rod and charge-discharge mechanism may be subject to the influence of hot carbon dioxide gas, and both must be kept lubricated during long periods when they are not accessible. The use of mineral oil-based lubricating fluids, e.g. oils and greases, in atomic reactors has been attended with some difficulties. For instance, it has been discovered that certain types of mineral oils used as grease lubricants thicken up appreciably when subjected to radiation from a radio-active source. Thus grease derived from indiscriminately-selected mineral oils may thicken up to an unacceptable extent over an extended period of time, so that their lubricating effect ceases to be effective. Also greases thickened up with soaps will quickly become adversely affected by continuous exposure to carbon dioxide at elevated temperature, and are also affected by radiation.

The effect of radiation on mineral oils depends on the constituents of those oils. For instance for a given level of radiation dosage, a mineral oil tends to thicken, the amount of thickening being an inverse function of the aromatic content of the oil, e.g. a direct function of the viscosity index (V.I.) of the oil. This effect is shown in the following experiment wherein 5 different oils derived from the same crude oil, but refined to differing degrees so that each oil possessed a different aromatic content varying from no aromatics to 92% aromatics, were exposed to about 1,000 megarads of radiation. The results are shown in FIG. 1 of the accompanying drawing wherein percentage increase in viscosity is plotted against aromatics content. The amount of thickening falls off sharply up to about 30% aromatics, and thereafter decreases relatively slowly with increasing aromatic content.

Figure 2:
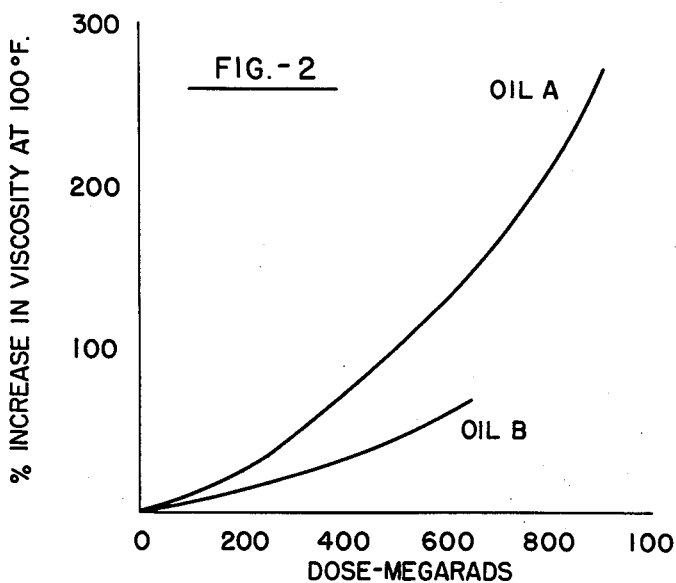

Different mineral oils differ in the rate at which they thicken on exposure to increasing amounts of radiation. Thus oils of relatively low viscosity index i.e. higher aromaticity thicken less readily than oils of high viscosity index, i.e. lower aromaticity. This effect is illustrated by the following experiments wherein two oils were subjected to an increasing radiation dosage. Oil A was a naphthenic oil of viscosity index 64, and oil B was a solvent extract from a lubricating oil refining process, containing a large proportion of aromatics, and having a viscosity index of —55. The results of this experiment are shown in FIG. 2 of the accompanying drawing wherein the rate of increase of oil B is much lower than that of oil A.

The effect of exposure to hot carbon dioxide of a grease having a conventional metal soap thickener may be illustrated by the following experiment:

A mineral oil of viscosity 50 SUS/210° C. and a V.I. of 42 was thickened up to a grease consistency with 22% by weight of the sodium soap of rapeseed oil. The grease was then placed in a Norma-Hoffman bomb containing carbon dioxide at 110 lbs./sq. in. and held for 100 hours. A pressure drop of 19 lbs./sq. in. $CO_2$ pressure occurred during this time, as a result of $CO_2$ adsorbtion by the grease, and the grease itself became quite hard. Further the drop-point of the grease fell from an initial value of 406 to 207° F.

In formulating a grease suitable for lubricating moving parts associated with nuclear reactors, such as hereinbefore described, the properties are such that the grease, while possessing adequate resistance to thickening during exposure to radiation or hot carbon dioxide should also be resistant to leakage and bleeding at elevated temperatures. To some extent, these properties are incompatible, for if a base oil possessing a sufficiently high viscosity index, e.g. 100, be employed to ensure adequate viscosity at elevated temperatures, such an oil will be subjected to a marked percentage increase in viscosity when subjected to even moderate amount of radiation.

The greases of the present invention are characterized in being structurally stable at elevated temperatures in that they do not leak or bleed oil to an unacceptable extent when applied to moving parts associated with nuclear reactors, do not thicken on exposure to radiation experienced therein, and are resistant to the effects of hot carbon dioxide gas. To this end, the invention provides a grease comprising a mineral oil of viscosity index not greater than 75, thickened to a grease consistency with carbon black. The greases of the present invention may also contain a stabilizing proportion e.g. 0.1% to 5% of an ashless dispersant as hereinafter described. A preferred type of base oil is one that contains more than 30 weight percent of aromatic constituents.

The carbon black used to obtain the greases of this invention are themselves resistant to the effects of radiation and hot carbon dioxide, and they have the added advantage that they appear to shield to some extent the base oils from the effect of radiation. The preferred carbon black is an acetylene black. Sufficient carbon black is used to thicken grease consistency, preferred proportions being from 5% to 40% by weight based on the mineral oil.

The preparation of the greases can be carried out by conventional methods, e.g. a portion of the oil is added to the carbon black in a grease-making kettle to form a compact mass, the rest of the oil being added slowly to obtain the required grease consistency.

The present invention may be illustrated by the following experiments and examples.

Several mineral oils of viscosity indices varying from 33 to 99 were thickened to a grease consistency with from 16% to 18% by weight of carbon black, and subjected to a radiation dose of $10^8$ rads and $10^9$ rads. The degree of thickening of the greases was then determined by micropenetration before and after exposure to radiation in which a cone, weighing 57 grams with plunger, was dropped into the grease and left for 5 seconds. The structural stability (resistance to bleeding and leakage) was determined by the ASTM 1263 wheel bearing test equipment which was run for 8 hours at 120° C. The results are shown in Table I.

*Table I*

| Mineral Base Oil | V.I. of Oil | Viscosity of oil, cs./ 210° F. | Penetration of Grease before Radiation Exposure (mm./10) | Radiation Dosage, $10^8$ Rads. | Penetration of Grease after Radiation Exposure (mm./10) | Wheel Bearing Test Leakage | |
|---|---|---|---|---|---|---|---|
| | | | | | | (grms.) Grease | Oil |
| A [1] | <0 | 22.5 | 135 | 1 | 136 | 0.2 | 0.45 |
| B | 33 | 14.7 | 149 | 1 | 146 | 0.3 | 2.0 |
| | | | | 10 | 162 | | |
| C | 50 | 41.4 | 114 | 1 | 115 | 0.1 | 0.25 |
| D | 65 | 7.46 | 87 | 1 | 120 | 1.9 | 1.8 |
| E | 66 | 14.2 | 135 | 1 | 145 | 0.4 | 1.5 |
| | | | | 10 | 149 | | |
| F | 99 | 14.6 | 211 | 1 | ([2]) | ([3]) | ([3]) |

[1] Oil A was the solvent extract from a lubricating oil refining process, and was a highly aromatic oil.
[2] Semi-fluid.  [3] Runs out.

It will be seen from Table I that base oils thickened with carbon black are acceptable using base oils having a viscosity index up to about 66, but a base oil having a V.I. of 99 is unsuitable as this was completely mobile in the wheel bearing test after radiation.

Table I also demonstrates the unexpected properties of the grease of this invention. Thus even with base oils of extremely low V.I. such as oil A, the grease behaved satisfactorily on the wheel bearing test at 120° C. Another advantage in using carbon black as the grease thickener is that it appears to exert a shielding effect for the thickening effect of radiation on the base oils. Thus even using a base of V.I. 66, (oil E), the penetration resistance change after exposure to $10^9$ rads was still acceptable. However, greases formulated from base oils of a V.I. of 99 were unacceptable, as failing both the penetration and wheel bearing tests.

The resistance of the grease of the present invention to hot carbon dioxide was demonstrated by exposing a grease obtained from oil B described above thickened up with 16% of carbon black to the test in the Norma-Hoffman bomb as hereinbefore described. In this test no reduction in $CO_2$ pressure was observed during the test. Micropenetration before and after were 146 and 149 respectively, and the drop point remained at above 500° F. Thus this grease was substantially unaffected by the test conditions.

The structural stability of the greases according to the present invention may be further improved by incorporating in the grease a stabilizing proportion, for example from 0.1% to 5% by weight of an oil-soluble ashless detergent. By the term "ashless detergent" is meant one which leaves no ash when burnt, and thus excludes all metal-containing oil-soluble detergents such as metal sulphenates or phenates. Such metal containing compounds, if they found their way into nuclear reactors, would tend to become radioactive on their own account, and there would also be a risk of corrosion of metallic components associated with the reactor, for instance metallic fuel-containers.

Particularly preferred dispersants are copolymeric compounds containing a polar group, such as a nitrogen and/or oxygen-containing group, copolymerised with an oil-soluble comonomer. Examples of such dispersants are oil-soluble copolymers of copolymerisable nitriles, cyanoethyl ethers, amines, amides, carbamates, esters of mono- and/or di-carboxylic acids, particularly of maleic acid esters or aryl acids, cyclic nitrogen-containing compounds, particularly N-vinyl lactams such as N-vinyl pyrrolidone, anils and pyridines, hydrazines and maleic anhydride. The oil-solubilising monomer or monomers used may be any hydrocarbon containing a polymerisable unsaturated linkage. Thus a $C_4$ to $C_{24}$ aliphatic or aromatic compound may be used, such as an alkyl ester of an alpha-beta unsaturated mono- or di-carboxylic acid. It is preferred that the solubilising compounds contain aromatic groups, as these are more soluble in an oil of low V.I., i.e. an oil containing a high proportion of aromatic compounds. Thus styrene or alkylated styrene or $C_4$ to $C_{24}$ alkyl phenol compounds may be used as the solubilising monomer. Cyclic polymerisible compounds may also be used, such as cyclohexane or vinyl cyclohexane.

Particularly useful dispersants are oil-soluble co-polymers of N-vinyl pyrrolidone and copolymers of esters derived from aromatic alcohols and maleic anhydride, or polymers and copolymers of alkoxylated esters of aromatic alcohols or cyclic alcohols with carboxylic acids.

It is preferred that the dispersant be intimately mixed with the grease base oils to form a grease composition containing not more than 5% of the total weight of the dispersant.

To prevent corrosion of metallic parts of the reactor, it is preferred that the greases of the present invention contain as little sulphur as possible. Thus sulphur-free detergents should preferably be used.

The stabilizing effect of the modified greases of this experiment is illustrated by the following examples.

2% by weight of an ashless detergent was incorporated in greases made from oils B and E as hereinbefore described, thickened with 16% of carbon black. The ashless detergent used was an oil-soluble tripolymer derived from 75 parts by weight of lauryl fumarate, 19 parts by weight vinyl acetate and 4 parts by weight of N-vinyl pyrrolidone. Greases without the dispersant and derived from oils B and E were enumerated greases B and E respectively. All the greases were then tested in the wheel bearing test as hereinbefore described, and the results are enumerated in Table II.

*Table II*

| Grease: | Wheel bearing test oil leakage (grams) |
|---|---|
| B | [1]3.2 |
| B+2% dispersant | [1]2.4 |
| E | [2]1.6 |
| E+2% dispersant | [2]1.0 |

[1] Wheel bearing test carried out at 310° F.
[2] Wheel bearing test carried out at 250° F.

It will be seen from Table II that the incorporation of the dispersant was able to effect a significant reduction in the oil-leakage under the conditions of the wheel bearing test.

It is also preferred that the grease according to this invention contain a minor proportion, e.g. about 1% by weight based on the total grease, of a mineral oil antioxidant. Examples of such antioxidants are phenyl-naphthylamine, n-n'-di-sec-butyl p-phenylene diamine, 2:4 dimethyl-6-tert-butyl phenol, 2:6 di-tert-butyl 4 methyl phenol, alkylated bisphenols, and phenothiazine.

What is claimed is:

1. A method of lubricating relatively moving contacting surfaces subjected to nuclear radiation comprising maintaining on said surfaces a radiation resistant lubricating grease comprising a major amount of a mineral lubricating oil having a viscosity index of less than 75 and containing more than 30 wt. percent of aromatic constituents and 5 to 40 wt. percent, based on said mineral oil, of carbon black.

2. A method according to claim 1 wherein said contacting surfaces are subject to the influence of hot carbon dioxide gas and said carbon black is acetylene black.

3. A method of lubricating the control rod mechanism of a nuclear reactor, said mechanism being subjected to radiation of 0.2 to 100 rads/hour and to the presence of hot carbon dioxide gas, which comprises lubricating said mechanism with a metal-free grease consisting essentially of a major amount of a mineral lubricating oil having a viscosity index of less than 75 and containing more than 30 wt. percent of aromatic constituents and 5 to 40 wt. percent, based on the weight of said mineral oil, of acetylene carbon black.

4. A method of lubricating relatively moving contacting surfaces subjected to nuclear radiation, comprising maintaining on said surface a radiation resistant lubricating grease consisting essentially of a major amount of a mineral lubricating oil containing at least 30 wt. percent aromatics and having a V.I. of 33, 16 wt. percent of carbon black, and 2 wt. percent of an ashless detergent which is an oil-soluble tripolymer consisting of 75 parts by weight of lauryl fumarate, 19 parts by weight of vinyl acetate and 4 parts by weight of N-vinyl pyrrolidone.

References Cited in the file of this patent

UNITED STATES PATENTS 2,453,153     Morway et al. _____ Nov. 9, 1948
2,912,416     Newey _____ Nov. 10, 1959

OTHER REFERENCES

"Radiation Resistant Greases," Bolt et al., California Research Corp., Richmond, Calif.; U.S.A.E.C. Technical Info. Service Extension, Oak Ridge, Tenn. AECU–3148 June 30, 1956, 42 pp.

Scientific Lubrication, vol. 9, No. 4, April 1957, pp. 28–30.

"Lubrication Problems at Nuclear Power Stations," Copper et at.; Scientific Lubrication vol. 9, No. 8, August 1957, pp. 31, 32, 34, 35 and 39.